(12) United States Patent
Romain

(10) Patent No.: US 11,075,889 B2
(45) Date of Patent: Jul. 27, 2021

(54) METHOD AND SYSTEM FOR ENCRYPTING/DECRYPTING DATA WITH ULTRA-LOW LATENCY FOR SECURE DATA STORAGE AND/OR COMMUNICATION

(71) Applicant: IPception, Montigny-le-Bretonneux (FR)

(72) Inventor: Jacotin Romain, Montigny-le-Bretonneux (FR)

(73) Assignee: IPCEPTION, Montigny-le-Bretonneux (FR)

( * ) Notice: Subject to any disclaimer, the term of this patent is extended or adjusted under 35 U.S.C. 154(b) by 120 days.

(21) Appl. No.: 16/203,948

(22) Filed: Nov. 29, 2018

(65) Prior Publication Data
US 2019/0166105 A1   May 30, 2019

(30) Foreign Application Priority Data

Nov. 30, 2017  (FR) ...................... 1771292

(51) Int. Cl.
*H04L 29/06* (2006.01)
*H04L 9/06* (2006.01)
*H04L 9/08* (2006.01)

(52) U.S. Cl.
CPC ........ *H04L 63/0435* (2013.01); *H04L 9/0631* (2013.01); *H04L 9/0643* (2013.01);
(Continued)

(58) Field of Classification Search
CPC ..... H04L 9/0656; H04L 9/065; H04L 9/0643; H04L 9/0662; H04L 9/0668; H04L 63/04;
(Continued)

(56) References Cited

U.S. PATENT DOCUMENTS 7,133,525 B1 *  11/2006  DeGregorio ......... H04N 1/4406
380/244

OTHER PUBLICATIONS

Kemenes, et al. "Chapter 6: Stream Ciphers ED." Handbook of applied cryptography, CRC press series on discrete mathematices and its applications, CRC press, Boca Raton, FL, 1996, pp. 191-222.
(Continued)

*Primary Examiner* — Edward Zee
(74) *Attorney, Agent, or Firm* — Leason Ellis LLP

(57) ABSTRACT

The system comprises a sending entity (100) and a receiving entity (200). The sending entity (100) is suitable for generating a random mask (MA) with m bits; applying an XOR operation between the raw data block to be encrypted (T) and the random mask (MA) thus generated to obtain a primary encrypted block (CPV) with m bits; and applying a permutation (PE) on the concatenation of the random mask (MA) and the primary encrypted block (CPV) to obtain a secondary encrypted block (CS). The receiving entity (200) is suitable for receiving the secondary encrypted block (CS) of 2*m bits; applying an inverse permutation (PI) on the secondary encrypted block thus received to obtain the de-concatenation of a random mask (MA) and a primary encrypted block (CPV) with m bits; and applying an XOR operation between the primary encrypted block (CPV) and the random mask (MA) thus de-concatenated to obtain a block in clear (T) with m bits. The permutation (PE) and its inverse permutation (PI) are secret and only shared and known by the communicating entities (100, 200).

10 Claims, 13 Drawing Sheets

(52) U.S. Cl.
    CPC ............ *H04L 9/0656* (2013.01); *H04L 9/085* (2013.01); *G06F 2207/7233* (2013.01); *H04L 2209/04* (2013.01)

(58) Field of Classification Search
    CPC ............ H04L 63/0428; H04L 63/0435; H04L 63/0457
    See application file for complete search history.

(56) References Cited

OTHER PUBLICATIONS

Mennink, B., et al. "Security of full-state keyed sponge and duplex: Applications to authenticated encryption." International Association for Cryptologic Research, vol. 20150923:154002, Sep. 23, 2015, pp. 1-28.

Daemen, et al. "Permutation-based encryption, authentication and authenticated encryption." Directions in Authenticated Ciphers, 2012, Stockholm, Sweden.

Bertoni, et al. "Keccak and the SHA-3 Standardization." NIST, Feb. 6, 2013.

* cited by examiner

METHOD AND SYSTEM FOR ENCRYPTING/DECRYPTING DATA WITH ULTRA-LOW LATENCY FOR SECURE DATA STORAGE AND/OR COMMUNICATION

CROSS-REFERENCE TO RELATED PATENT APPLICATIONS

This application claims the benefit of priority under 35 U.S.C. Section 119(e) of French Patent Application number 1771292 filed Nov. 30, 2017, which is incorporated by reference in its entirety.

The present invention generally relates to data encryption/decryption with ultra-low latency.

More particularly, it relates to the field of cryptography, namely confidentiality by binary computer data encryption for secure storage and/or communication purposes.

It is generally applicable irrespective of the storage means and methods used or the communication medium used (mechanical, electrical, optical, magnetic, electromagnetic, dielectric, chemical, and in general any communication medium based on an undulating behavior, radiofrequency, NFC, RFID, wired, wireless or the like). Likewise, it applies irrespective of the location used: on a planet (or a satellite), or inside it (underground), in seas and oceans irrespective of depth, in the gas atmosphere irrespective of the altitude, or in space.

Symmetrical cryptography, also called "secret key cryptography", is already known, in which secret information is shared between two entities communicating with one another. In an ideal world, the strength of a symmetrical cryptographic method is measurable only by the computing security, i.e., it is necessary for the shared secret key to be able to assume enough different values for an exhaustive attack by symmetrical testing of all keys to be much too long to be carried out. Of course, the computing security changes with technical progress, and the growing power of computing means constantly pushes it back.

In secret key symmetrical cryptography, an encryption algorithm is already known that is considered to be perfectly safe. This is the so-called "Vernam" cipher, also called "disposable binary mask" to emphasize that the secret key is used only once.

The drawback of the "Vernam" cipher is that, to encrypt a message with m bits, it is first necessary to have exchanged a secret key also with m bits with the recipient of the message, through a completely safe avenue, failing which encryption becomes pointless.

The current solution to resolve the issue of the prior secret key/disposable binary mask exchange consists of using pseudorandom functions based on secure hash algorithms such that the two communicating entities are capable of simulating an identical pseudorandom sequence for the message encryption/decryption operations.

Nevertheless, the secure hash algorithm-based encryption and authentication functions have many flaws and weaknesses. First of all, by nature, they are reproducible, predictable and able to be calculated in advance. Additionally, various techniques exist for breaking them. Furthermore, secure hash functions are very costly in terms of computing time and therefore cause considerable latency, since ultimately these functions try to simulate a chaotic system as defined by Lorenz (chaos theory), such that an infinitesimal parameter variation at a given moment can cause the final result to vary tremendously (i.e., the encrypted result in the case of encryption).

Furthermore, the history of symmetrical encryption shows that the strength of secure hash function-based algorithms is not based solely on their computing security, but is unfortunately also related to their design flaws.

As a result, any encryption attempt based on the creation of a pseudorandom sequence based on a secure hash algorithm involves a robustness lower than the desired computing security (i.e., the size of the shared secret key). Furthermore, this lower robustness cannot be demonstrated. As a result, the known solutions based on secure hash algorithms must be discarded and a new avenue must be used.

The present invention indeed provides a solution that improves the symmetrical cryptography situation for secure data storage and/or communication.

It relates to a method for asynchronous symmetrical encryption of an initial message in clear in N successive blocks of m bits each of raw data implemented between a sending entity and a receiving entity.

According to a general definition of the invention, for each block of m bits, the following steps are provided:
  generating a disposable random mask of m bits;
  applying an exclusive OR (XOR) operation between the raw data block to be encrypted and the random mask thus generated to obtain a primary encrypted block of m bits;
  applying a permutation of bits on the concatenation of the disposable random mask and the primary encrypted block to obtain a secondary encrypted block of 2*m bits, the permutation being secret and only shared and known by the sending and receiving entities.

The symmetrical cryptographic method according to the invention has the advantage of using a "Vernam" encryption to encrypt the data in clear with a disposable random mask in which the exchanges do not use secure hash algorithms. Furthermore, the processing operations are quick, easy, with ultra-low latency. The hardware implementation can be parallelized for each block of the message to be processed by the sending and receiving entities and requires few transistors and therefore low electrical consumption, thus making it ideal for real-time and/or on-board computer systems. Thus, the cryptography method according to the invention respects and preserves the original principle of complete security and therefore an associated resistance based solely on computing security as well as a resistance to quantum computer algorithms owing to nonuse of number theory. Furthermore, the method according to the invention is asynchronous, which makes it possible to process any message independently of the order and reception of previous messages.

By way of explanation, here we will use the traditional four characters in cryptography to describe the cryptographic method according to the invention and the advantages that it provides:

a. Alice wants to send an encrypted message to Bob;
b. Bob wants to decrypt the message received from Alice;
c. Eve is a passive attacker who wants to listen to the messages exchanged between Bob and Alice without changing them;
d. Mallory is an active attacker who wants to listen to, but also change, duplicate or delete, the messages exchanged between Alice and Bob.

Alice and Bob further have a secret shared only by them, and therefore unknown by Eve and Mallory.

The technical solution according to the invention uses the following five axioms:

a. Axiom 1: A random binary chain here forming the "random disposable mask" is by definition unpredictable, and not foreseeable;
b. Axiom 2: The most effective way for Alice to generate an unpredictable random binary chain (random disposable mask) both for Bob and for the observers of the exchange, Eve and Mallory, is to use a random generator based on the observation of physical phenomena, or ideally on quantum phenomena (see Schrödinger paradox). However, the use of a pseudorandom binary chain generator remains possible as long as the initial seed used does not depend on the secret shared with Bob, and is therefore completely unknown by Bob, Eve and Mallory;
c. Axiom 3: Let $\oplus$ be the exclusive OR operator (acronym XOR). Let T be a binary message to be encrypted made up of m bits and MA a random binary chain made up of m bits. R the result (here called primary encrypted block) of the exclusive OR function (XOR) with the operands T and MA is a random chain of m bits (R is therefore unpredictable according to axiom 1, the security of the Vernam encryption remains perfect as long as MA is random): $R = T \oplus MA$;
d. Axiom 4: Let $\|$ be the concatenation operator. R the concatenation of two random binary chains X and Y of any size is a new random binary chain (R is therefore unpredictable according to axiom 1, if X and Y are also unpredictable): $R = X \| Y$;
e. Axiom 5: Let Z be any binary random chain made up of m bits, and PE any arbitrary permutation of m elements, the result of the permutation of the binary chain Z by the permutation of bits PE is also a binary random chain.

The principle of the technical solution according to the invention consists of taking the inverse of the Kerckhoffs principle (also called Shannon maxim), in which Alice communicates to Bob, for each sent message, the random secret to be used to decrypt said message, but keeps the encryption system itself a secret. Conversely here, the common secret shared between Alice and Bob is the encryption method (the encryption system), which will be used identically and systematically for each message. We will see later that this encryption method is a bit permutation.

In the solution according to the invention, the encryption key of each message here is completely random and used only once (also called disposable random mask for each message) and completely unknown and unpredictable for Bob, Eve and Mallory. For each message received from Alice, Bob now needs to know the random key used for decryption. The solution used is that Alice communicates the Vernam encrypted message (here called primary encrypted message) plus the encryption key (here called disposable random mask) together. The solution according to the invention doubles the size of the messages sent, but makes it possible to offer a completely unpredictable perfect encryption.

Since Eve and Mallory know that a sent message contains both the encryption key (random mask) and the primary encrypted message (which is a simple exclusive OR (XOR) between the text to be encrypted and the encryption key), the secret shared between Alice and Bob then comes into play by adding confusion to the sent message. This confusion here is a simple bit permutation on the concatenation of the encryption key and the primary encrypted message in order to obtain the secondary cipher.

By nature, the encryption key of each message is random (each bit has an equal chance of being equal to 0 or 1), and therefore the primary encrypted text is also random by nature (an XOR applied between a text and a random chain also yields, as result, a random bit chain where each bit has an equal chance of being equal to 0 or 1). The confusion created by the permutation suffices to break the relationship that exists between the encryption key and the primary encrypted text.

Advantageously, it is not necessary to change bit permutation for each message, since it is the random and therefore statistically unique nature of each encryption key that protects the entire system.

According to specific embodiments, the encryption method includes one or more of the following features, considered alone or according to all technically possible combinations:
  the size m of the blocks is a multiple of 2;
  the permutation substantially has no fixed point;
  the encryption method further comprises a prior step for secret communication of the permutation intended for the receiving entity and the sending entity.

The present invention also relates to a method for the asynchronous symmetrical decryption of an encrypted raw data message between a sending entity and a receiving entity.

According to another aspect of the invention, the decryption method comprises the following steps:
  receiving a secondary encrypted block of 2*m bits encrypted using the encryption method according to the invention,
  applying an inverse permutation on the secondary encrypted block thus received to obtain the de-concatenation of a random mask of m bits and a primary encrypted block of m bits;
  applying an exclusive OR operation (XOR) between the primary encrypted block and the random mask thus de-concatenated to obtain a block in clear of m bits, the inverse permutation being secret and only shared and known by the sending and receiving entities.

The present invention further relates to a system comprising a sending entity and a receiving entity, the sending entity being suitable for:
  generating a random mask of m bits;
  applying an exclusive OR operation (XOR) between the raw data block to be encrypted and the random mask thus generated to obtain a primary encrypted block of m bits;
  applying a permutation on the concatenation of the random mask and the primary encrypted block to obtain a secondary encrypted block of 2*m bits,
while the receiving entity is suitable for:
  receiving the secondary encrypted block of 2*m bits coming from the sending entity;
  applying an inverse permutation on the secondary encrypted block thus received to obtain the de-concatenation of a random mask and a primary encrypted block of m bits; and
  applying an exclusive OR operation (XOR) between the primary encrypted block and the random mask thus de-concatenated to obtain a block in clear of m bits, the permutation and its inverse permutation being secret and only shared and known by the sending and receiving entities.

In practice, the sending or receiving entity is of the type comprising fixed or programmable logic circuits based on transistors and diodes.

The present invention further relates to a computer program, characterized in that it comprises instructions for implementing, via a processor, the encryption method and/or the decryption method according to the invention when said computer program is executed by said processor.

Other features and advantages of the invention will appear in light of the description and drawings, in which.

Figure 7:
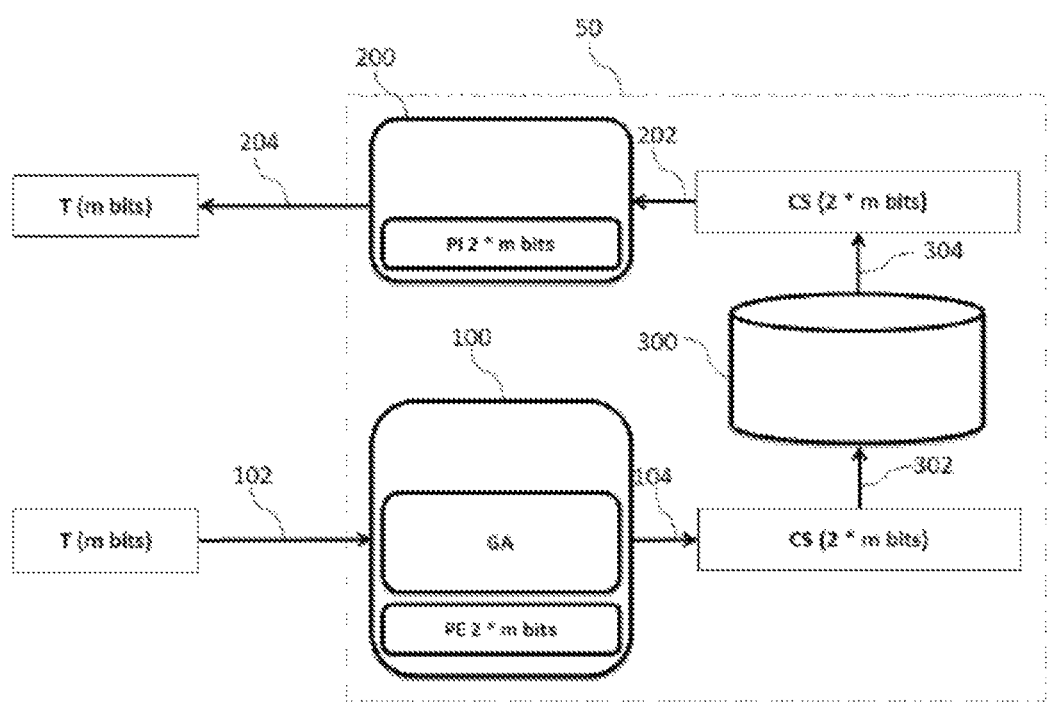
Figure 8:
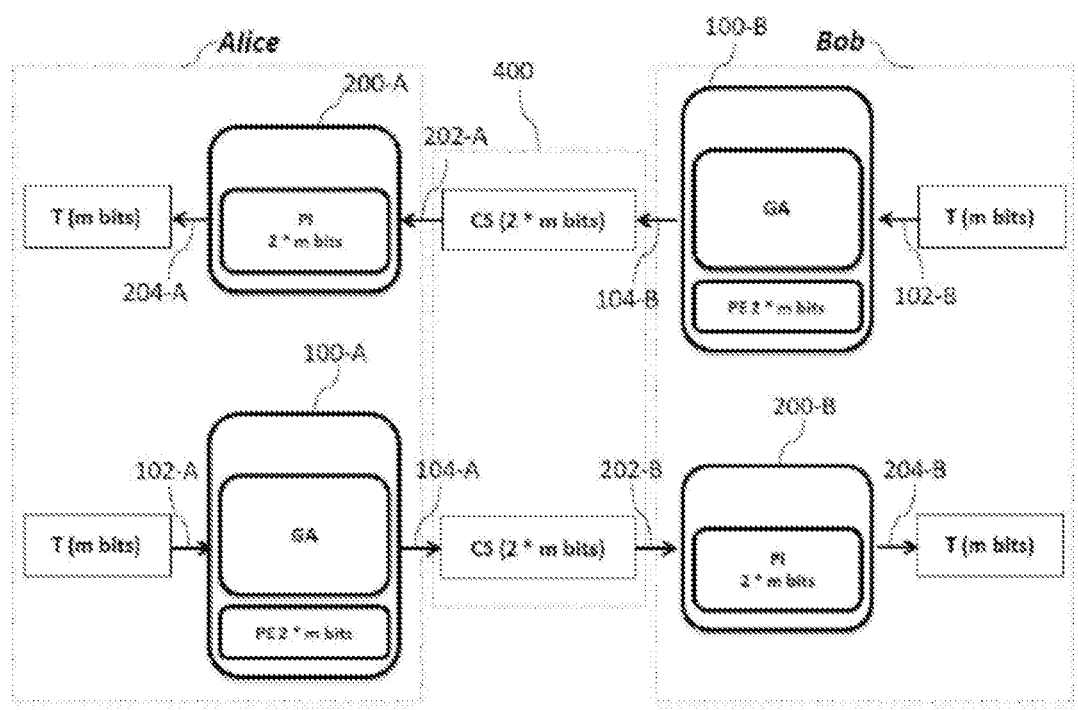
Figure 9:
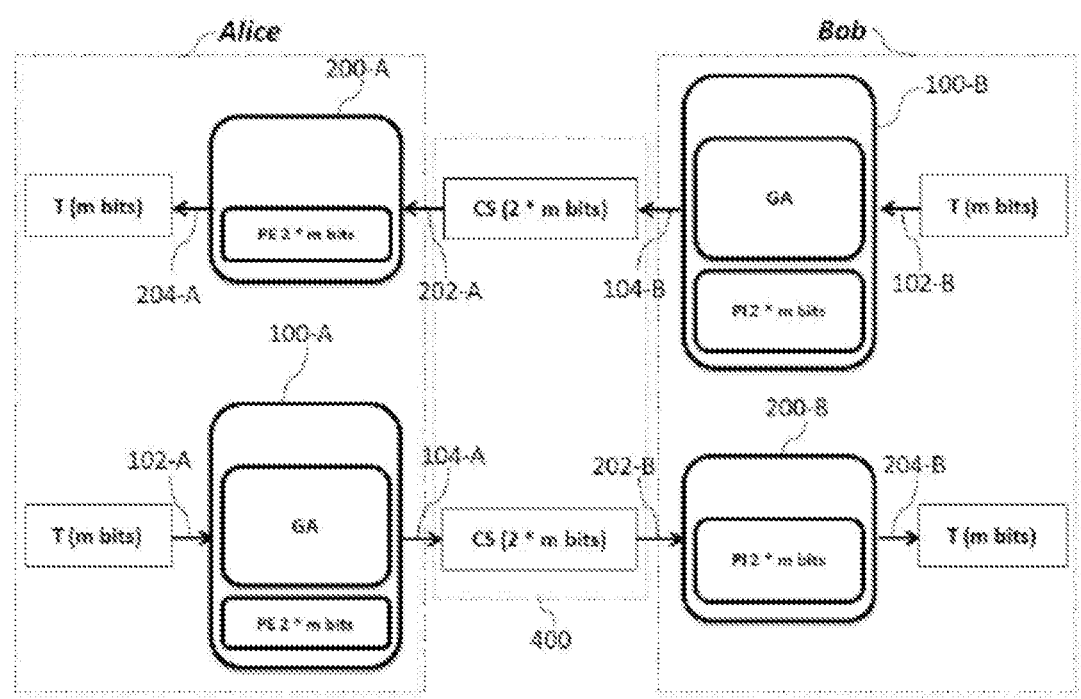

FIG. 7 schematically illustrates the method for encrypting/decrypting data stored on a permanent memory, nonvolatile memory or the like;

FIG. 8 schematically illustrates the communication of encrypted data between two entities;

FIG. 9 schematically illustrates the communication of encrypted data between two entities with prior decision by the entity using the inverse permutation; and FIGS. 10, 11, 12, and 13 illustrate examples of encrypted/decrypted messages according to the invention.

Figure 1:
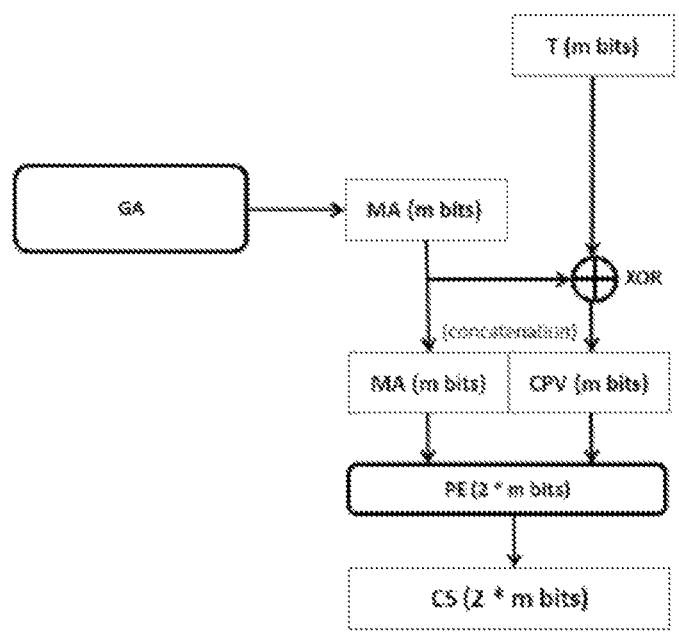
FIG. 1 is a flowchart illustrating the steps of the encryption method according to the invention.

In reference to FIG. 1, an initial message in clear T to be encrypted has m raw data bits. A random generator GA generates a random mask MA with m bits. For example, the random generator is based on the observation of a physical phenomenon. Alternatively, the generator GA may be of the quasi- or pseudorandom type.

The random mask MA with m bits is generated for each new message T to be encrypted. As described above, it is the random mask MA that will serve as encryption key.

An exclusive OR operation (XOR) is then applied between the message in clear T to be encrypted and the random mask MA thus generated to obtain a primary encrypted message CPV with m bits. As described above, the primary encrypted message CPV is a "Vernam" cipher with the qualities described above that result therefrom.

Lastly, a bit permutation PE is applied on the concatenation of the random mask MA with m bits and the primary encrypted block CPV with m bits to obtain a secondary encrypted message CS with 2*m bits (two times m bits). The size of the secondary encrypted message CS is therefore twice that of the message T to be encrypted.

The permutation of bits PE is secret and only shared and known by sending and receiving entities that will be described in more detail hereinafter in reference to FIGS. 7 to 9.

Preferably, the permutation of bits substantially has no fixed point (derangement). Examples of permutation of bits PE are described in reference to FIGS. 10 to 13.

The computing security of the encryption depends on the size p of the permutation and the number of its fixed points. Ideally, it is preferable use permutations without fixed points, also called derangements.

Figure 2:
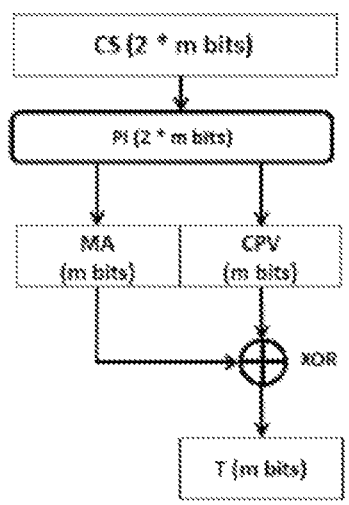
FIG. 2 is a flowchart illustrating the steps of the decryption method according to the invention.

In reference to FIG. 2, we have described the decryption method counteracting the encryption method described in reference to FIG. 1. The message to be decrypted is made up of 2*m bits. The shared secret is a permutation of bits PE with size 2*M bits, for which it is necessary to use the inverse permutation PI for the decryption. One thus applies an inverse permutation PI on the secondary encrypted block thus received to obtain the de-concatenation of a random mask of m bits MA and a primary encrypted block CPV of m bits. One next applies an exclusive OR operation (XOR) between the primary encrypted block CPV and the random mask MA thus de-concatenated to obtain a block in clear T of m bits corresponding to the original message with m bits.

Figure 3:
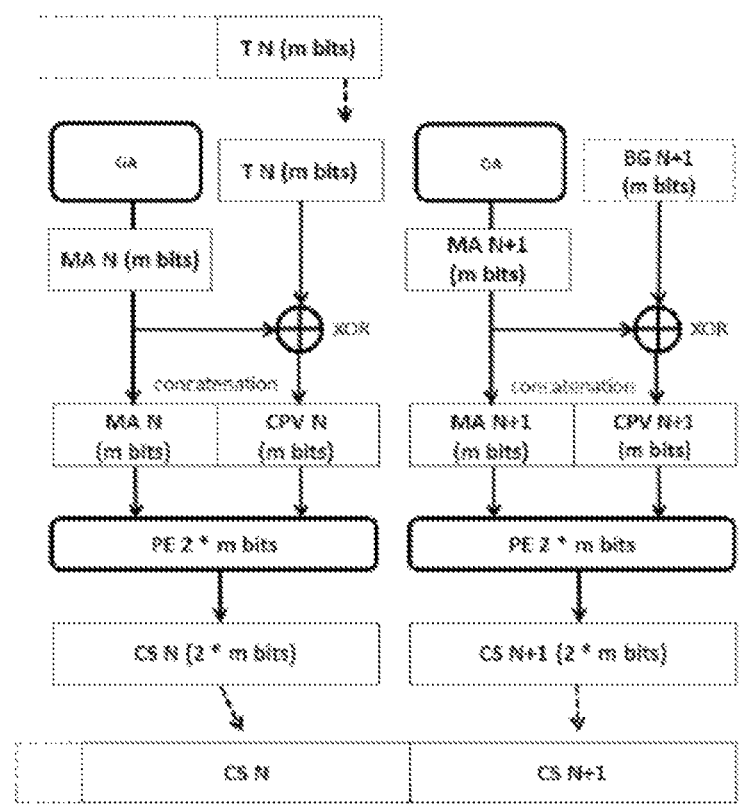
FIG. 3 is a flowchart illustrating the steps of the encryption method by block in which the last block of the message has a size identical to that of the block.

In reference to FIG. 3, we have shown block encryption of a message in clear made up of N blocks with m bits each. Here, the last block N of the message to be encrypted has size m bits. In this example, a new block N+1 is then added to the message T to be encrypted.

The processing of the block N is according to that described in reference to FIG. 1 to arrive at a secondary encrypted block CS N of 2*m bits.

The processing of the block N+1 consists of creating a padding (filler) block N+1 here referenced BG N+1 made up of a bit with binary value 1 followed by m−1 bits with binary value 0. One then applies the encryption of the block BG N+1 using the method according to FIG. 1 to arrive at the secondary encrypted block CS N+1 with 2*m bits that makes up the last block of the encrypted message.

Figure 4:
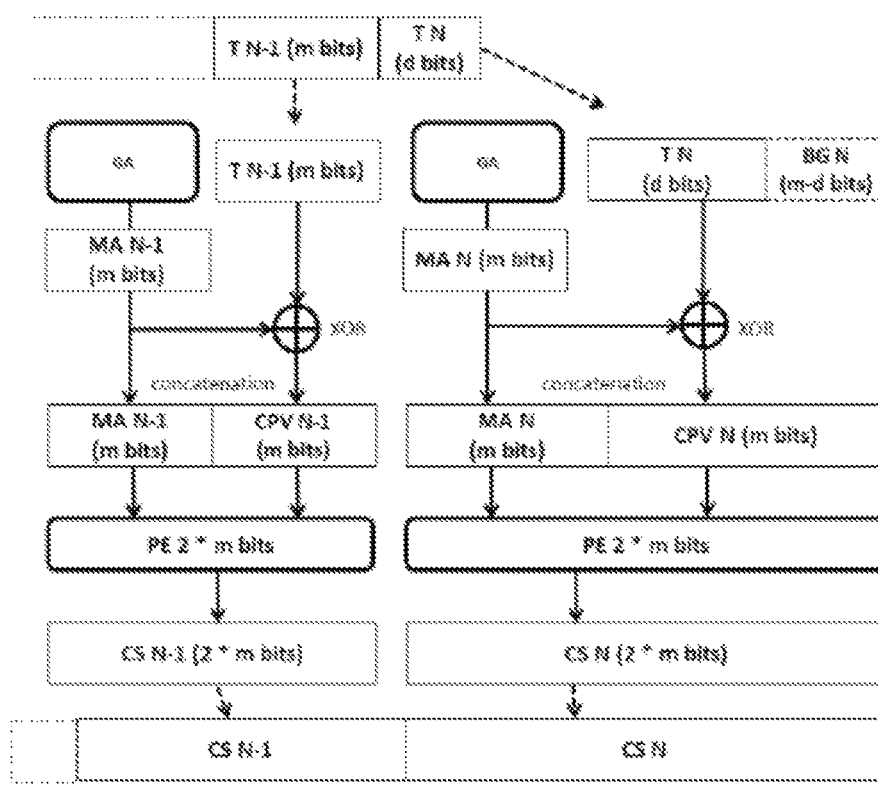
FIG. 4 is a flowchart illustrating the steps of the encryption method by block in which the last block of the message has a size smaller than that of the block.

In reference to FIG. 4, block encryption is shown of a message in clear made up of N blocks with m bits each in which the last block N has a size d smaller than m bits. In this example, one adds (padding or filler) m−d bits to the block N to obtain a block N with m bits. In practice, the filler consists of adding a bit with binary value 1 followed if necessary by several bits with binary value 0. This block constitutes the last block of the encrypted message.

The processing of block N−1 is according to that described in reference to FIG. 1 to arrive at a secondary encrypted block CSN−1 with 2*m bits.

The processing of the block N consists of encrypting the block N thus filled and here referenced BG N. One then applies the encryption of the block BG N using the method according to FIG. 1 to arrive at a secondary encrypted block CS N with 2*m bits.

Figure 5:
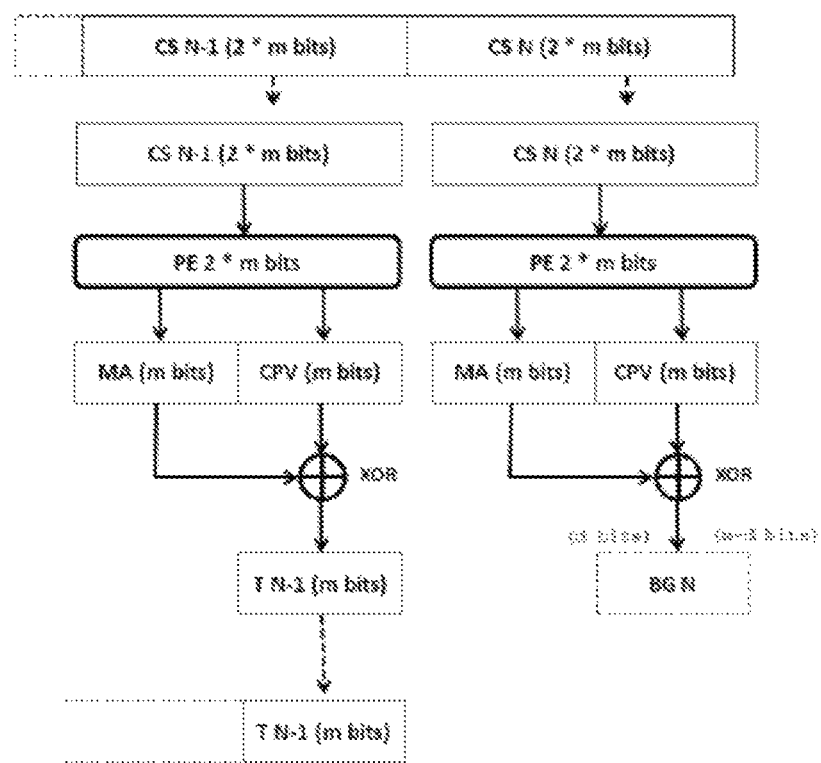
FIG. 5 is a flowchart illustrating the steps of the decryption method according to the invention in which the last block of the method has a size identical to that of the block.

In reference to FIG. 5, we have described the decryption method counteracting the encryption method described in FIG. 3. The message to be decrypted is made up of N*2*m bits. The shared secret is a permutation of bits PE with size 2*m bits for which it is necessary to use the inverse permutation PI for the decryption.

To determine the size of the message to be decrypted, one should look in the last secondary encrypted block CS and seek to determine the first bit with binary value 1 starting from the end. If this bit at 1 is the first bit of block N, then the preceding block is the last block to be decrypted. Thus, from an encrypted message made up of N*2*m bits, one obtains a message in clear made up of N−1 blocks for a total of (N−1)*m bits.

Figure 6:
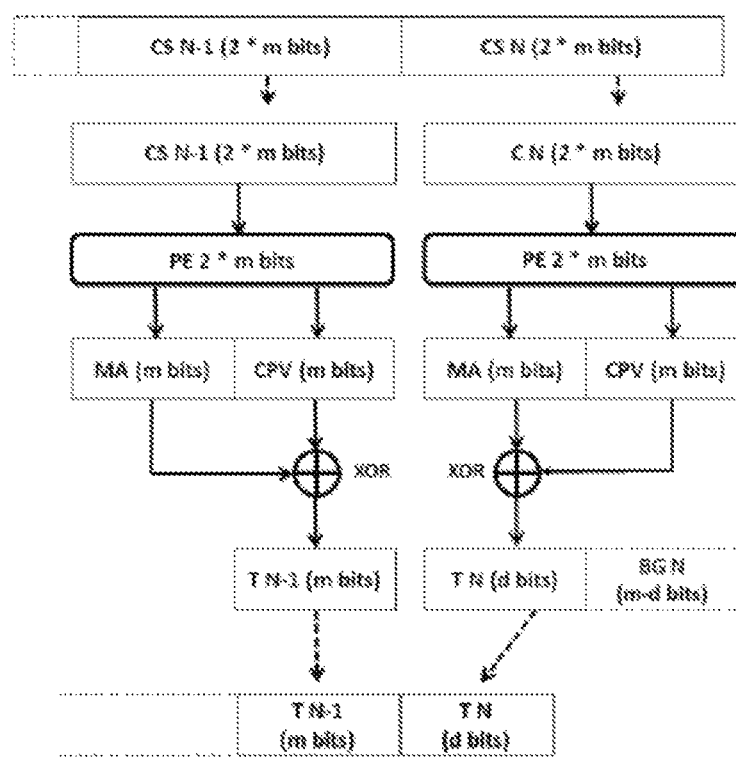
FIG. 6 is a flowchart illustrating the steps of the decryption method according to the invention in which the last block of the message has a size smaller than that of the block.

In reference to FIG. 6, the decryption method is described that counteracts the encryption method described in reference to FIG. 4. The message to be decrypted is made up of N*2*m bits. The shared secret is a permutation of bits PE with size 2*m bits for which it is necessary to use the inverse permutation PI for the decryption.

To determine the size of the message to be decrypted, one needs to look in the final secondary encrypted block CS and seek to determine the first bit with binary value 1 starting from the end. If this bit at 1 is not the first bit of the block N, then all of the bits to its left constitute the final data bits of the message in clear, i.e., the first d bits of the block N.

Thus, from an encrypted message made up of N*2 m bits, one obtains a message in clear made up of (N−1)*m+d bits, with d less than m.

In reference to FIG. 7, a data processing module 50 is shown intended to be incorporated into a microprocessor or microcontroller computer system and wherein the processing method according to the invention is implemented on a memory of the type belonging to the group formed by a mass memory, a permanent memory, a volatile memory, a non-volatile memory (hard drive, flash memory, magnetic tape, optical disc, memristor, etc.) or the like.

In practice, the step for writing in the memory 300 consists of receiving a data block in clear T of m bits and applying it 102 to the encryption device 100, which delivers, as output 104, a secondary encrypted block CS of 2*m bits after permutation of bits PE of 2*m bits. The secondary block CS is stored via the input 302 in the memory 300.

Reciprocally, the reading step 304 in the memory 300 consists of reading a block of encrypted data of 2*m bits and applying it 202 to the decryption device 200, which delivers, as output 204, a block in clear T of m bits after inverse permutation PI of 2*m bits.

For example, the architecture of the encryption 100 and decryption 200 devices comprises a processor, a memory and a communication interface connected to one or several data buses (not shown).

In reference to FIGS. 8 and 9, a communication channel 400 is shown for exchanging encrypted data between two entities, individualized into ALICE and BOB.

In reference to FIG. 8, the entity ALICE applies the permutation of bits PE to the encryption device 100-A while the entity BOB applies its inverse permutation PI to the decryption device 200-B to exchange encrypted data CS from ALICE to BOB via the communication channel 400. Reciprocally, the entity BOB applies the permutation PE to the encryption device 100-B while the entity ALICE applies its inverse permutation PI at the decryption device 200-A to exchange encrypted data CS from BOB to ALICE via the communication channel 400.

For example, the communication channel 400 is of the optical, wired or wireless type.

In reference to FIG. 9, an alternative is shown in which it is decided beforehand that it is ALICE who will use the permutation PE both for encryption and decryption while the entity BOB will use only the inverse permutation PI both for encryption and decryption.

Figure 10:
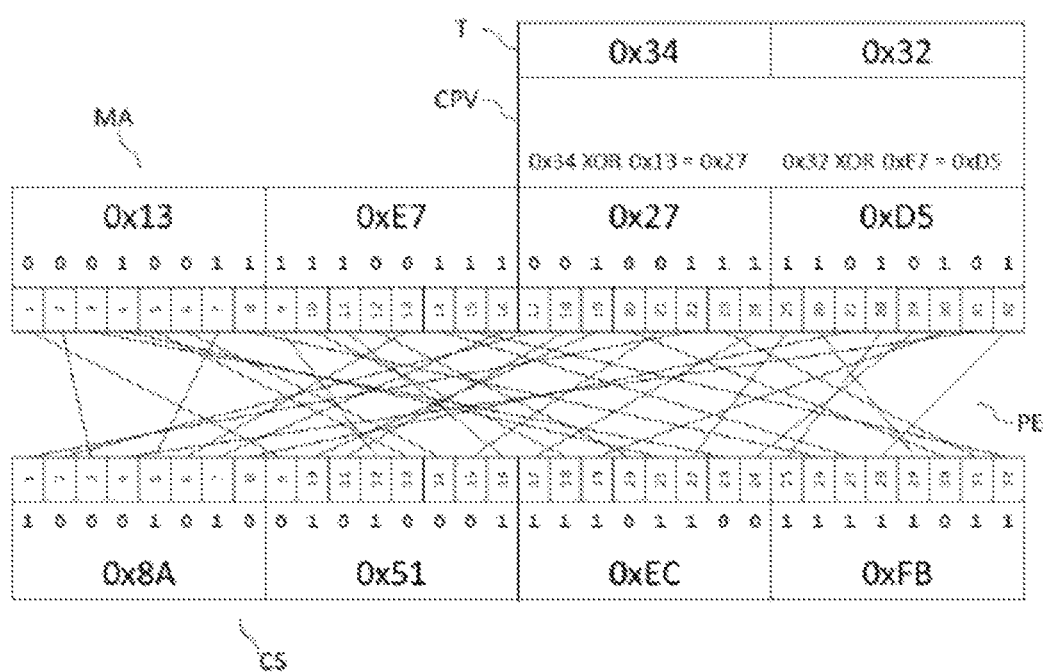
Figure 11:
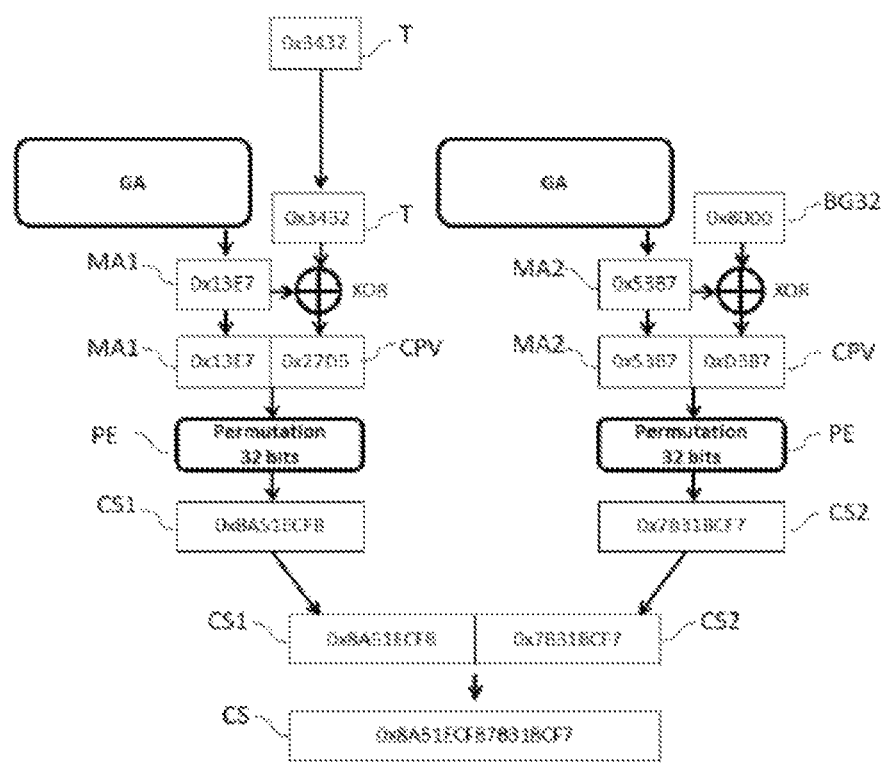
Figure 12:
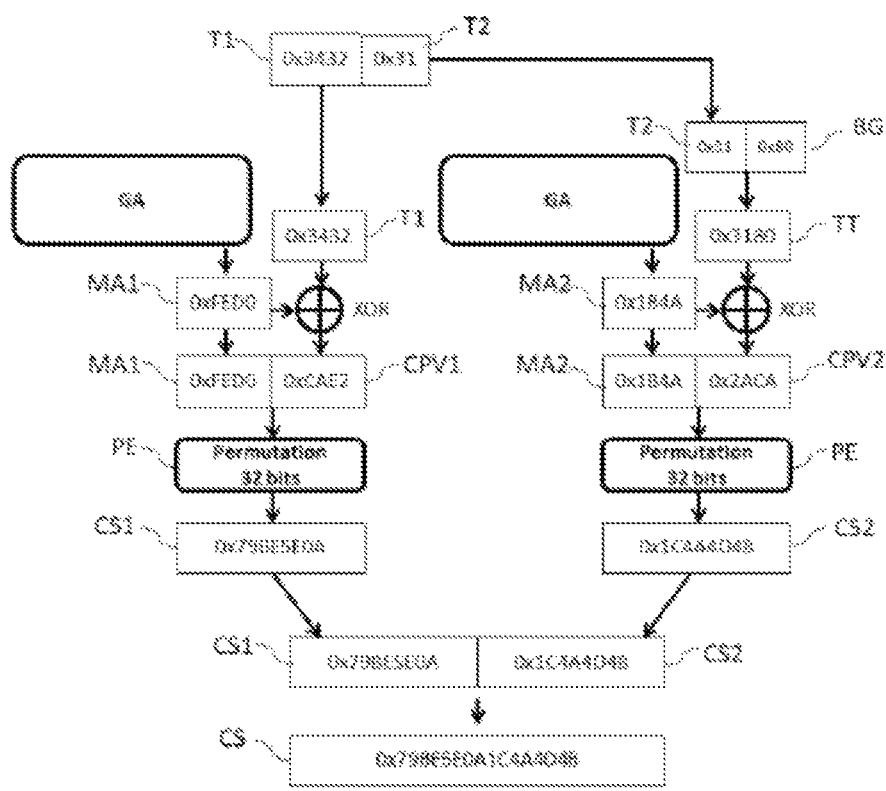

In reference to FIGS. 10 to 12, examples of encryptions are shown from blocks with 16 bits. In practice, the method according to the invention applies to permutations of bits with sizes that are multiples of 2.

To facilitate the reading, the examples are given in Hexadecimal coding.

The block T with 16 bits in clear here is equal to 0x3432 in Hexadecimal code. The random mask MA is equal to 0x13E7 in Hexadecimal. The primary cipher CPV is equal to 0x27D5. The secondary cipher is equal to 0x8A51ECFB in Hexadecimal.

By applying a padding of 0x8000 (FIG. 11), the secondary encrypted message is equal to 0x8A51ECFB7B31BCF7 in Hexadecimal.

By applying a padding of 0x80 (FIG. 12) to block 0x31, the secondary encrypted message CS is 0x79BE5E5E01C4A4D4B in Hexadecimal.

Figure 13:
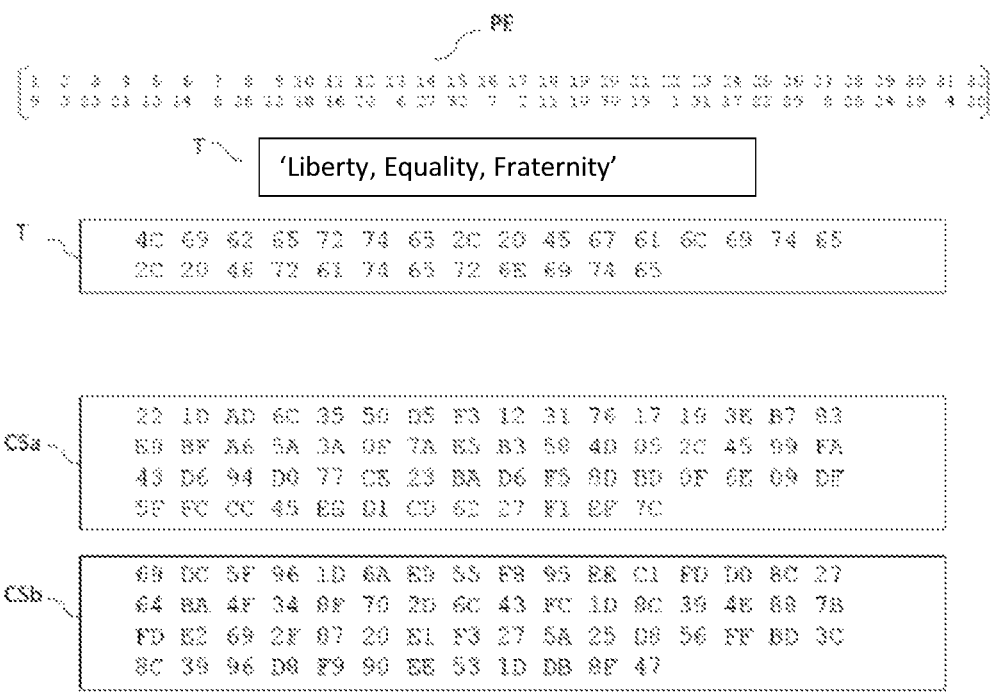

In reference to FIG. 13, we have shown an example message in clear T on 28 bytes corresponding to the message in clear "Liberty Equality Fraternity". The encryption method according to the invention may provide several different random secondary encrypted messages CSa and CSb from a single permutation of bits PE. In the example of FIG. 13, the permutation has size 32 bits.

The invention claimed is:

1. A method for asynchronous symmetrical encryption of an initial message in clear (T) in N successive blocks of m bits each of raw data implemented between a sending entity (100) and a receiving entity (200), characterized in that, for each block (T) of m bits to be encrypted, the following steps are performed:
   generating a new disposable random mask (MA) of m bits for each block (T) of m bits to be encrypted;
   applying an exclusive OR (XOR) operation between the raw data block to be encrypted (T) and the random mask (MA) thus generated to obtain a primary encrypted block (CPV) of m bits; and
   applying a permutation of bits (PE) on the concatenation of the disposable random mask (MA) and the primary encrypted block (CPV) to obtain a secondary encrypted block (CS) of 2*m bits, the permutation (PE) being secret and only shared and known by the sending (100) and receiving (200) entities.

2. The method according to claim 1, characterized in that the size m of the blocks to be encrypted (T) is a multiple of 2.

3. The method according to claim 1, characterized in that the bit permutation (PE) substantially has no fixed point.

4. The method according to claim 1, characterized in that it further comprises a prior step for secret communication of the bit permutation (PE) intended for the receiving entity (100) and the sending entity (200).

5. A method for the asynchronous symmetrical decryption of a message encrypted according to the data encryption method implemented between a sending entity (100) and a receiving entity (200) according to claim 1, characterized in that it comprises the following steps:
   receiving a secondary block of 2*m bits encrypted according to claim 1,
   applying an inverse bit permutation (PI) on the secondary encrypted block thus received to obtain the de-concatenation of a random mask of m bits (MA) and a primary encrypted block (CPV) of m bits;
   applying an exclusive OR operation (XOR) between the primary encrypted block (CPV) and the random mask (MA) thus de-concatenated to obtain a block in clear (T) of m bits, the inverse permutation (PI) being secret and only shared and known by the sending (100) and receiving (200) entities.

6. A non-transitory computer-readable medium storing instructions for implementing, via a processor, the encryption method according to claim 1 when said instructions are executed by said processor.

7. A system for the asynchronous encryption/decryption of an initial message in clear (T) of N successive blocks of m bits each of raw data between a sending entity (100) and a receiving entity (200), characterized in that the sending entity (100) includes a hardware processor that is configured to perform steps of:
   generating a new random mask (MA) of m bits for each block (T) of m bits to be encrypted;
   applying an exclusive OR operation (XOR) between the raw data block to be encrypted (T) and the random mask (MA) thus generated to obtain a primary encrypted block (CPV) of m bits;

applying a bit permutation (PE) on the concatenation of the random mask (MA) and the primary encrypted block (CPV) to obtain a secondary encrypted block of 2*m bits (CS), while the receiving entity (200) includes a processor that is configured to perform steps of:

receiving the secondary encrypted block of 2*m bits thus encrypted (CS) coming from the sending entity (100);

applying an inverse bit permutation (PI) on the secondary encrypted block (CS) thus received to obtain the de-concatenation of a random mask (MA) of m bits and a primary encrypted block (CPV) of m bits;

applying an exclusive OR operation (XOR) between the primary encrypted block (CPV) and the random mask (MA) thus de-concatenated to obtain a block in clear (T) of m bits, the permutation (PE) and its inverse permutation (PI) being secret and only shared and known by the sending (100) and receiving (200) entities.

8. The system according to claim 7, characterized in that the sending entity (100) and the receiving entity (200) communicate the secondary encrypted data (CS) between one another through a communication channel (400).

9. The system according to claim 7, characterized in that the secondary encrypted data (CS) is stored in at least one of a volatile memory and a non-volatile memory.

10. The system according to claim 7, characterized in that the processor of at least one of the sending and/or receiving entity (100, 200) includes one of fixed and programmable logic circuits.

* * * * *